United States Patent [19]

Wakebe

[11] Patent Number: 4,956,655
[45] Date of Patent: Sep. 11, 1990

[54] PROJECTING APPARATUS

[75] Inventor: Shiro Wakebe, Tokyo, Japan

[73] Assignee: Kabushiki Kaisha System Ray, Tokyo, Japan

[21] Appl. No.: 271,059

[22] Filed: Nov. 14, 1988

Related U.S. Application Data

[63] Continuation-in-part of Ser. No. 21,972, Mar. 5, 1987.

[30] Foreign Application Priority Data

Nov. 17, 1987 [JP] Japan .......................... 62-174285[U]

[51] Int. Cl.$^5$ ............................................. G03B 3/10
[52] U.S. Cl. ....................................... 353/101; 353/99
[58] Field of Search ..................... 353/30, 35, 37, 42, 353/46, 48, 50, 51, 94, 98, 99, 101, 77, 121, 122

[56] References Cited

U.S. PATENT DOCUMENTS

| 3,315,563 | 4/1967 | Harper et al. | 353/99 X |
| 3,472,587 | 10/1969 | Liguori | 353/DIG. 3 X |
| 3,639,048 | 2/1972 | Heaney | 353/101 |
| 3,814,513 | 6/1974 | Nims et al. | 353/94 X |
| 4,192,584 | 3/1980 | Dougherty | 353/94 X |
| 4,196,461 | 4/1980 | Geary | 353/99 X |
| 4,494,839 | 1/1985 | Brueckner | 353/101 |

Primary Examiner—Harry N. Haroian
Attorney, Agent, or Firm—Oliff & Berridge

[57] ABSTRACT

A projecting apparatus has a fixed mirror and two rotary mirrors whose rotary axes cross each other at a right angle are disposed on the projection side of a slide projector. An image is moved on a screen by controlling the angle of rotation of each of the rotary mirrors. With this arrangement, it is possible to impart motion to the image without need to perform projection while switching the slide projectors or to move the slide projectors themselves.

11 Claims, 4 Drawing Sheets

PROJECTING APPARATUS

BACKGROUND OF THE INVENTION

1. Field of the Invention

The present invention relates to a projecting apparatus and, more particularly, to a projector type imaging apparatus for projecting an image onto a projection screen.

2. Description of the Related Art

A conventional multi-slide projector which projects a large size image has been known.

As shown in FIG. 3, such a multi-slide projector is arranged so that a plurality of slide projectors 1A, 1B, . . . , 3C is controlled by a computer C4 to project onto a single screen a plurality of images which is partially superimposed upon one another, and thereby reproduces a still large size image on the screen. More specifically, the slide projectors 1A, 1B and 1C project onto a region R1 images which are superimposed upon one another, the slide projectors 2A, 2B and 2C project onto a region R2 images which are superimposed upon one another, and the slide projectors 3A, 3B and 3C project onto a region R3 images which are superimposed upon one another. Thus, a single image of large size is projected onto the screen. In FIG. 3, a photograph of an automobile is shown as projected onto the screen. In this case, the image projected by the slide projectors 2A, 2B and 2C is partially superimposed upon the partial image projected by the slide projectors 1A, 1B and 1C and the partial image projected by the slide projectors 3A, 3B and 3C, so that the image which includes no lines suggesting seams is projected from side to side. If an image having motion (for example, an image of a running vehicle) is to be projected by using such a multi-slide projector, a multiplicity of slides on which a moving object which has been continuously photographed are recorded as a series of still images are prepared and the slides are set in the multi-slide projector. The slides are sequentially switched at high speeds under computerized control to impart motion to the projected image.

However, if the above-described multi-slide projector is used to impart motion to the projected image, the following problems are encountered. Since a multiplicity of slides are needed, time-consuming work is required to form the required sides, and switching control of the slide projectors becomes complex. To solve the above-described problems, motion is imparted to the image projected onto the screen by changing the angles of the slide projectors themselves. However, since the slide projectors are large and heavy, a large-size apparatus for changing the angles of the projectors is needed and it is therefore difficult to satisfactorily control such a multi-slide projector.

SUMMARY OF THE INVENTION

It is an object of the present invention to provide an imaging apparatus which is capable of solving the above-described problems and which can impart motion to an image projected onto a screen under simple control.

To achieve the above and other objects, in accordance with the present invention, there is provided a projecting apparatus which includes a projector for projecting an image, a first rotary mirror disposed for rotation about its rotary axis and arranged to reflect the image projected by the projector, a second rotary mirror disposed for rotation about a rotary axis which forms a predetermined angle with respect to the rotary axis of tic first rotary mirror and arranged to reflect the image reflected by the first rotary mirror toward a projection screen, and control means for driving the first rotary mirror and the second rotary mirror to rotate about their respective axes.

In accordance with the present invention, the image which is passed through the projector is projected onto the projection screen by way of the first rotary mirror and the second rotary mirror. The first rotary mirror and the second rotary mirror are disposed for rotation about their respective rotary axes, and these rotary axes are arranged so as to form a predetermined angle (for example, an angle of 90°) therebetween. Accordingly, it is possible to move the image projected onto the projection screen by rotating the first rotary mirror and the second rotary mirror.

As described above, in accordance with the present invention, since the image projected onto the projection screen is moved by rotating the rotary mirrors, it is possible to provide the advantage that motion is imparted to the projected image by means of a simple construction without the need to use complex control for switching of slides or a device for moving the slide projector.

DESCRIPTION OF THE PREFERRED EMBODIMENT

Figure 1:
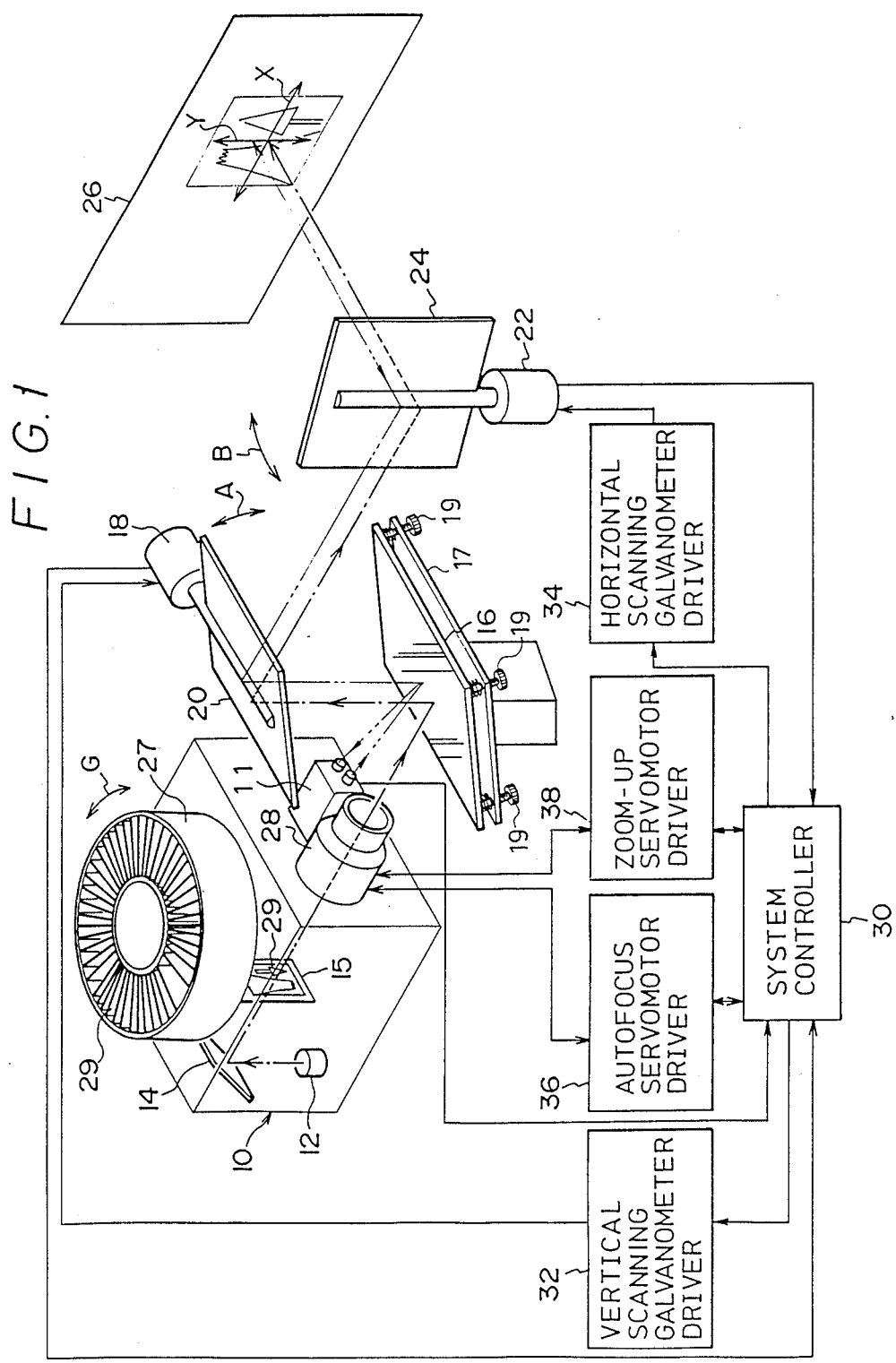
FIG. 1 is a diagrammatic view showing in block from a construction of one embodiment of the present invention.

FIG. 1 is a diagrammatic view showing a construction of a projector type imaging apparatus according to a presently preferred embodiment. A slide projector 10 has a projecting light source 12. A reflecting mirror 14 is disposed on an emission side of a projecting light source 12 so as to reflect the light of the projecting light source 12 toward a slide setting section 15. Any one slide selected from slides 29 can be set in the slide setting section 15 by insertion. A rotary magazine 27 which accommodates a plurality of slides 29 is rotatably disposed on the top of the slide projector 10. When the magazine 27 is rotated in either of the directions indicated by an arrow G and is then stopped at the position at which the desired slide 29 is located above the slide setting section 15, the slide 29 located above the slide setting section 15 is inserted into the same by a slide ins rting means (not shown). The slide 29 is returned to the magazine 27 by the slide inserting means after projection.

An optical system 28 for projecting an image from the slide 29 is disposed on the exit surface side of the slide setting section 15. The optical system 28 is provided with a focus adjusting lens for effecting automatic focusing of the image projected onto a screen 26. The focus adjusting lens is moved by a servomotor (not shown) which is connected to an autofocus servomotor driver 36.

The slide projector 10 is provided with an optical-pathlength measuring sensor 11 for measuring the optical path length from the slide projector 10 to the portion of the screen 26 onto which an image is projected. The optical path length measuring sensor 11 has two windows, and is arranged to emit an infrared-ray beam through one of the two windows and receive light reflected from the screen 26, outputting a signal indicative of the position at which the reflected light has been received. A system controller 30 performs arithmetic operations upon the optical path length between the slide projector 10 and the screen 26 on the basis of the signal indicative of the position at which the reflected light has been received, finds the position of the focus adjusting lens on the basis of the focusing formula of the optical system 28, and controls the autofocus servomotor driver 36 for focusing purposes.

The optical system 28 has a zoom lens for enlarging and reducing the image projected onto the screen 26 and a servomotor (not shown) for moving the zoom lens. The servomotor is connected to a zoom-up servomotor driver 38.

A mounting plate 17 is disposed on the projecting side of the slide projector 10 so as to form an angle of approximately 45° with respect to the horizontal plane. The approximate center of a fixed or stationary reflection mirror 16 is mounted on the upper surface of the mounting plate 17 by way of a ball joint in such a manner that the fixed reflection mirror 16 is rotatable with respect to the mounting plate 17. Adjustment screws 19 are screwed into three corners of the mounting plate 17, and the inclination of the reflection surface of the fixed reflection mirror 16 with respect to the optical axis of the optical system 28 can be adjusted by adjusting the amount by which the adjustment screws 19 project from the mounting plate 17. The inclination of the reflection surface of the fixed reflection mirror 16 with respect to the optical axis of the optical system 28 is normally set at angle of 45°.

A reflection mirror 20 is disposed on the reflection side of the fixed reflection mirror 16 in such a manner that their reflection surfaces are opposed to each other. The reflection mirror 20 is fixed to the rotary shaft of a vertical scanning galvanometer 18 whose rotary axis crosses the optical axis at right angles. A reflection mirror 24 is disposed on the reflection side of the reflection mirror 20 in such a manner that their reflection surfaces are opposed to each other. The reflection mirror 24 is fixed to the rotary shaft of a horizontal scanning galvanometer 22 whose rotary axis crosses the optical axis and the axis of the rotary shaft of the vertical scanning galvanometer 18. The screen onto which an image is projected is disposed on the reflection side of the reflection mirror 24.

The system controller 30 for controlling the above-described projector-type imaging apparatus is connected to the optical-path-length measuring sensor 11 for measuring the optical path length from the slide projector 10 to the image projecting surface of the screen 26, the autofocus servomotor driver 36, the zoom-up servomotor driver 38, the vertical scanning galvanometer driver 32, and the horizontal galvanometer driver 34. The vertical scanning galvanometer driver 32 is connected to the vertical scanning galvanometer 18, while the horizontal scanning galvanometer driver 34 is connected to the horizontal scanning galvanometer 22. The vertical scanning galvanometer 18 and the horizontal scanning galvanometer 22 respectively have position detectors for detecting the angular positions of their rotary shafts. The position detectors are connected to the system controller 30.

The operation of the above-described embodiment will be described below.

As shown in FIG. 1, the image projected from the slide projector 10 is reflected as a mirror image by the fixed reflection mirror 16. The image reflected by the fixed reflection mirror 16 is projected onto the reflection mirror 20 fixed to the rotary shaft of the vertical scanning galvanometer 18. A control program for controlling the angular position of the reflection mirror 20 is stored in advance in the system controller 30. The angle of rotation of the vertical scanning galvanometer 18 which has been detected by the position detector thereof is fed back to the system controller 30. Thus, the reflection mirror 20 is rotated in either of the directions indicated by an arrow A in accordance with the previously stored control program and thus the angular position of the reflection mirror 20 is controlled.

The image reflected from the reflection mirror 20 fixed to the rotary shaft of the vertical scanning galvanometer 18 is projected onto the reflection mirror 24 fixed to the rotary shaft of the horizontal scanning galvanometer 22. A control program for controlling the angular position of the reflection mirror 24 is stored in advance in the system controller 30, and the angle of rotation of the horizontal scanning galvanometer 22 which has been detected by the position detector thereof is fed back to the system controller 30. Thus, the reflection mirror 24 is rotated in either of the directions indicated by an arrow B in accordance with the previously stored control program and thus the angular position of the reflection mirror 24 is controlled.

As the reflection mirror 20 rotates in either of the directions indicated by the arrow A, the projected image moves on the screen 26 in the corresponding one of the vertical directions (directions indicated by an arrow Y in FIG. 1). As the reflection mirror 24 rotates in either of the directions indicated by the arrow B, the projected image moves on the screen 26 in the corresponding one of the horizontal directions (directions indicated by an arrow X in FIG. 1). Accordingly, it is possible to freely move the projected image.

Figure 2:
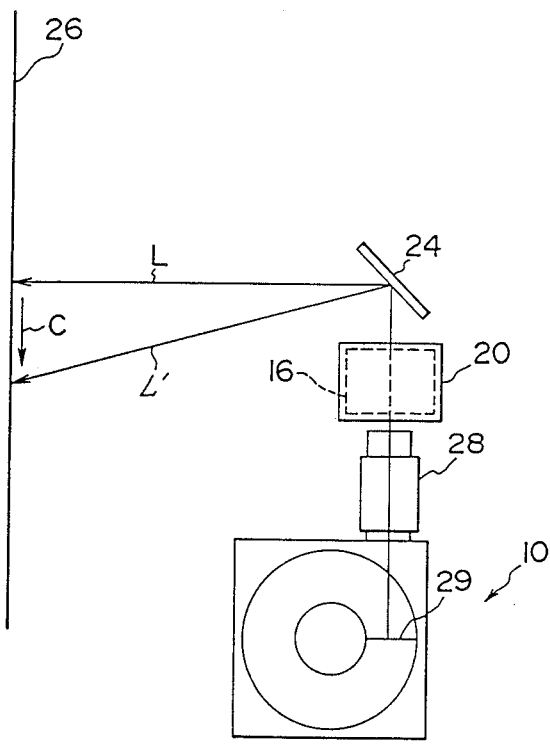
FIG. 2 is a diagrammatic view showing an optical path length along which an image is transmitted.

In a case where the screen 26 is of the flat type as shown in FIG. 2, when the image projected onto the screen 26 moves in the direction indicated by an arrow C, the optical path length L between the slide projector 10 and the screen 26 changes, and thus the projected image is defocused. In order to correct the defocussing of the image caused by changes in the optical length path L, the system controller 30 performs arithmetic operations upon an optical path length L' on the basis of the signal supplied from the optical-path-length measuring sensor 11. On the basis of the optical length path L', the system controller 30 outputs a control signal for focusing to the autofocus servomotor driver 36. The autofocus servomotor driver 36 effects focusing of the optical system 28 by controlling the servomotor provided therein on the basis of the control signal.

In accordance with a program or manual input, the system controller 30 outputs a control signal for moving the zoom lens of the optical system 28 to the zoom-up servomotor driver 38. The zoom-up servomotor driver 38 enlarges and reduces the projected image by moving the zoom lens of the optical system 28 on the basis of the control signal.

In the above-described embodiment, since the galvanometers are utilized to rotate the corresponding rotary mirrors, the projected image can be moved at high speeds. Since voltage control is utilized, the control system can be simplified and high control accuracy can be realized. In addition, there is no need for mechanical portions such as speed reducers.

Since the fixed reflection mirror 16 is incorporated, the image projected from the slide projector 10 is reflected by the fixed reflection mirror 16 and converted into a first mirror image in which the right and left of the original image are inversed. The right and left of the first mirror image are then inversed by the reflection mirror 20 to provide a second mirror image. The right and left of the second mirror image are again inversed by the reflection mirror 24 to provide a third mirror image. The third mirror image is projected onto the screen 26. For this reason, the slide 29 is inserted into the slide setting section 15 in such a manner that the front of the slide 29 is faces in a direction opposite to the direction in which it should face when an image is projected from the slide projector 10 directly onto the screen 26. Since the fixed reflection mirror 16 is disposed and the reflection mirrors 20 and 24 are disposed such that the respective rotary axes of the reflection mirror 20 and the reflection mirror 24 cross the optical axis at right angles, the projected image can be moved in the directions indicated by the arrows X and Y. It is to be noted that the projected image can be moved even if the reflection mirror 20 and the reflection mirror 24 are arranged such that the optical axis and the rotary shafts do not cross each other at right angles. In this case, however, there is a case where the projected image draws a circle on the screen 26 with respect to the X and Y directions.

The above description refers to the example in which the fixed reflection mirror is used. However, the fixed reflection mirror is omitted and the projected image is moved by changing the posture of the slide projector or the positions of the respective rotary mirrors. If either of the rotary mirrors is disposed in close proximity to the slide projector, the optical axis and the rotary mirror closer to the slide projector interfere with each other during rotation of the rotary mirror. It is, therefore, necessary to dispose the adjacent rotary mirror at a location which is spaced a predetermined distance apart from the optical system. However, if the distance between the slide projector and the mirror is too long, a vignette may occur in the projected image. Accordingly, if either of the rotary mirrors is to be disposed in the close proximity to the slide projector, it is desirable that the occurrence of vignettes be prevented by, for example, disposing a rotary mirror having an increased surface area. It is to be noted that, although focusing of the optical system 28 and enlarging and reducing operations are performed under the control of the system controller 30, these operations may be performed manually.

Figure 3:
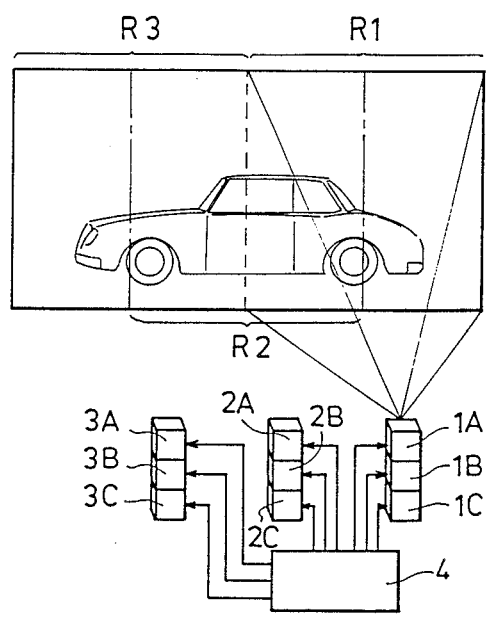
FIG. 3 is a diagrammatic view showing a conventional type of multi-slide projector.
Figure 4:
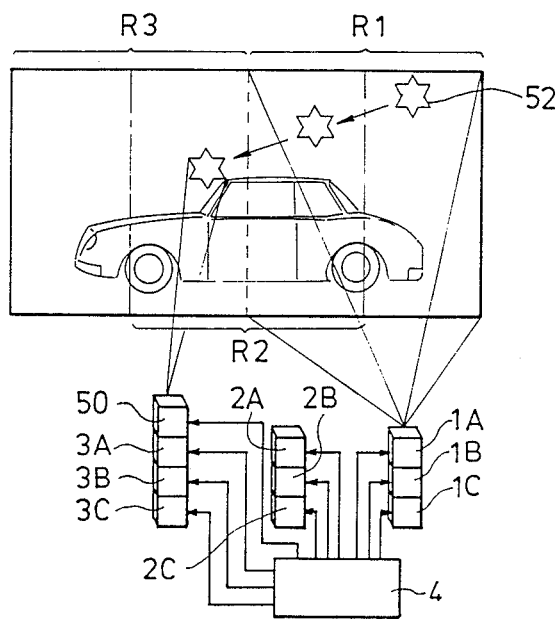
FIG. 4 is a diagrammatic view showing an example in which a projecting apparatus according to the present invention is used with a multi-slide projector.

The projector type imaging apparatus according to the present invention is employed in combination with, for example, a multi-slide projector. FIG. 4 shows a state wherein the projector-type imaging apparatus according to the presently preferred embodiment is combined with the multi-slide projector shown in FIG. 3. In this example, a projector-type imaging apparatus 50 according to the presently preferred embodiment is provided as the slide projector 3A. While a still image is being projected from the multi-slide projector, an image 52 which represents a star in FIG. 4 is projected from the projector-type imaging apparatus 50, and the rotary mirrors are rotated to move the image 52. Thus, in this example, the image 52 looks as if it were a shooting star. The projected image is moved by projecting slides while they are being switched. If the projector-type imaging apparatus according to the present embodiment is used in combination with the multi-slide projector, it is possible to impart swift and complex motion to the projected image without the need for switching a multiplicity of slides at high speeds. The above description refers to the example in which the galvanometers are utilized to rotate the corresponding rotary mirrors. However, a stepping motor or motor using a potentiometer for detecting the angle of rotation is used to rotate each of the rotary mirrors.

The present invention can be applied to a projected-image moving apparatus suitable for use in a video projector, a beam scanning apparatus for illumination with a light beam (a pin spot), and so forth. Furthermore, if the above-described fixed mirror and reflection mirrors are disposed in front of a camera and an image is projected while the reflection mirrors are being rotated, the overall image of an object can be projected without the need for moving the camera.

What is claimed is:

1. A projecting apparatus comprising:
   a projector for projecting an image;
   a first rotary mirror, a first rotary shaft for rotating said first rotary mirror, said first rotary shaft being arranged at a predetermined angle, to position the first mirror to reflect said image projected by said projector;
   a first driving means for rotating said first shaft of said first rotary mirror;
   a second rotary mirror, a second rotary shaft for rotating said second rotary mirror, said second rotary shaft being positioned at a predetermined angle in conjunction with said first rotary shaft of said first rotary mirror and being arranged to reflect said image reflected by said first rotary mirror toward a projection screen;
   a second driving means for rotating said second shaft of said second rotary mirror;
   control means for controlling said first and second driving means to effect angular rotation of said first and second rotary mirrors;
   a sensor means for measuring an optical path length between said projector and said image on said projection screen by emitting and receiving a light beam along the optical path to said projection screen to control the focus of said projector through said control means in accordance with variation of said optical path length to said image on the projection screen, said optical path being defined by the projector, the first and second mirrors and the projection screen; and
   said projector having an autofocus mechanism responsive to the sensor means for effecting automatic focusing of said projector so that said image projected onto said projection screen is maintained in focus.

2. A projecting apparatus according to claim 1, further comprising a multi-slide projector provided with a plurality of slide projectors and arranged to project a single image onto said projection screen by means of said plurality of slide projectors.

3. A projecting apparatus according to claim 2, wherein said control means moves said image projected on said projection screen from said projector, with said first and second rotary mirrors which rotate respectively with their shafts while said single image is projected onto said projection screen by said multi-slide projector.

4. A projecting apparatus comprising:
a projector for projecting an image;
a stationary mirror disposed such that an angle of its reflection surface, with respect to an optical axis of said projector, is adjustable and is arranged to reflect said image projected from said projector;
a first rotary mirror, a first rotary shaft for rotating said first rotary mirror about a first axis, said first rotary shaft being arranged, at a predetermined angle, to position the first mirror to reflect said image reflected by said stationary mirror;
a first driving means for rotating said first shaft of said first rotary mirror about a first axis;
a second rotary mirror, a second rotary shaft for rotating said second rotary mirror about a second axis, the second axis crossing the first axis at substantially a right angle and said second shaft being arranged to position the second mirror to reflect said image reflected by said first rotary mirror toward a projection screen;
a second driving means for rotating said second shaft of said second rotary mirror;
control means for controlling said first and second driving means to effect angular rotation of said first and second rotary mirrors;
a sensor means for measuring an optical path length between said projector and said image on said projection screen by emitting and receiving a light beam along an optical path to said projection screen to control the focus of said projector through said control means in accordance with variation of said optical path length to said image on the projection screen, said optical path being defined by the projector, the stationary mirror, the first and second mirror and the projection screen; and
said projector having an autofocus mechanism responsive to the sensor means for effecting automatic focusing of said projector so that said image projected onto said projection screen is maintained in focus.

5. A projecting apparatus according to claim 4, further comprising a multi-slide projector provided with a plurality of slide projectors and arranged to project a single image onto said projection screen by means of said plurality of slide projectors.

6. A projecting apparatus according to claim 5, wherein said control means moves said image projected on said projection screen from said projector with said first and second rotary mirrors which rotate respectively with their shafts while said single image is projected onto said projection screen by said multi-slide projector.

7. A projecting apparatus according to claim 4, wherein said projector is a slide projector.

8. A projecting apparatus according to claim 4, wherein the reflection surface of said stationary mirror is adjustable to rotate at substantially a right angle with respect to the optical axis of said projector, and said first shaft of said first rotary mirror is positioned to face the optical axis of said projector at substantially a right angle.

9. A projecting apparatus according to claim 1, wherein the driving means comprises a vertical scanning galvanometer connected to one of said first and second rotary mirrors to control movement of said image in a vertical direction on said projection screen, and a horizontal scanning galvanometer connected to the other of said first and second rotary mirrors to control movement of said image in a horizontal direction on said projection screen, whereby the image is projected so as to be movable on the projection screen.

10. A projecting apparatus according to claim 4, wherein the driving means comprises a vertical scanning galvanometer connected to one of said first and second rotary mirrors to control movement of said image in a vertical direction on said projection screen, and a horizontal scanning galvanometer connected to the other of said first and second rotary mirrors to control movement of said image in a horizontal direction on said projection screen whereby the image is projected so as to be movable on the projection screen.

11. A projecting apparatus comprising:
a projector for projecting an image;
a first rotary mirror;
means mounting the first mirror for rotation about a first axis, the first mirror being arranged to reflect an image projected by said projector;
first drive means for rotating the first mirror about the first axis;
a second rotary mirror;
means for mounting the second mirror for rotation about a second axis, the second mirror being positioned to reflect said image reflected by the first rotary mirror toward a projection screen;
a second drive means for rotating the second mirror about the second axis;
control means for controlling the first and second drive means of the first rotary mirror and the second rotary mirror to effect angular rotation of the first and second rotary mirrors;
a sensor means for measuring an optical path length between said projector and an image on said projection screen by emitting and receiving a light beam along an optical path including the first and second mirrors to said projection screen to control the focus of said projector through said control means in accordance with variation of said optical path length to said image on the projection screen, said optical path being defined by the projector; the first and second mirrors and the projection screen; and
said projector having an autofocus mechanism responsive to the sensor means for effecting automatic focusing of said projector so that said image projected onto said projection screen is maintained in focus.

* * * * *